US010195985B2

(12) United States Patent
Salter et al.

(10) Patent No.: US 10,195,985 B2
(45) Date of Patent: Feb. 5, 2019

(54) VEHICLE LIGHT SYSTEM

(71) Applicant: Ford Global Technologies, LLC, Dearborn, MI (US)

(72) Inventors: Stuart C. Salter, White Lake, MI (US); Carol C. Kordich, Grosse Pointe Woods, MI (US); Paul Kenneth Dellock, Northville, MI (US); James J. Surman, Clinton Township, MI (US); Julian Lopacki, Holly, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 15/453,149

(22) Filed: Mar. 8, 2017

(65) Prior Publication Data

US 2018/0257553 A1 Sep. 13, 2018

(51) Int. Cl.
*B60Q 3/20* (2017.01)
*B60Q 3/74* (2017.01)
*B60R 13/02* (2006.01)

(52) U.S. Cl.
CPC ............... *B60Q 3/20* (2017.02); *B60Q 3/74* (2017.02); *B60R 13/0212* (2013.01); *B60Q 2500/00* (2013.01)

(58) Field of Classification Search
CPC .............. B60Q 1/302; B60Q 2400/10; B60Q 2400/20; B60Q 2400/30; B60Q 2500/00; B60Q 3/20; B60Q 3/54; B60Q 3/78; B60R 13/0212; F21K 9/65; F21S 41/141; F21S 41/19; F21W 2106/00; F21Y 2105/10; F21Y 2115/10
See application file for complete search history.

(56) References Cited

U.S. PATENT DOCUMENTS

| 2,159,532 | A |   | 5/1939  | Prance |
|-----------|---|---|---------|--------|
| 2,486,859 | A |   | 11/1949 | Meijer et al. |
| 5,053,930 | A |   | 10/1991 | Benavides |
| 5,357,408 | A | * | 10/1994 | Lecznar ............ B60Q 3/51 296/214 |
| 5,434,013 | A |   | 7/1995  | Fernandez |
| 5,441,339 | A | * | 8/1995  | Mathias ............ B60Q 3/51 362/365 |
| 5,709,453 | A |   | 1/1998  | Krent et al. |
| 5,839,718 | A |   | 11/1998 | Hase et al. |
| 6,031,511 | A |   | 2/2000  | DeLuca et al. |
| 6,117,362 | A |   | 9/2000  | Yen et al. |
| 6,294,990 | B1|   | 9/2001  | Knoll et al. |

(Continued)

FOREIGN PATENT DOCUMENTS

CN 101337492 A 1/2009
CN 201169230 Y 2/2009
(Continued)

*Primary Examiner* — Hargobind S Sawhney

(74) *Attorney, Agent, or Firm* — Vichit Chea; Price Heneveld LLP

(57) ABSTRACT

A vehicle is provided herein. The vehicle includes a headliner including a cover. A first luminescent structure is disposed on the cover and is configured to luminesce in response to excitation by a light assembly. The light assembly is disposed below the headliner. A controller is configured to activate the light assembly. The light assembly independently illuminates various portions of the luminescent structure.

19 Claims, 11 Drawing Sheets

(56) References Cited

U.S. PATENT DOCUMENTS

| | | |
|---|---|---|
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,300,189 B2* | 11/2007 | England .......... B60Q 3/74 362/183 |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,371,033 B2 | 6/2016 | Dellock et al. |
| 9,440,583 B2 | 9/2016 | Salter et al. |
| 9,452,709 B2 | 9/2016 | Crespo |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0035300 A1* | 2/2003 | Branstetter .......... B60Q 1/2638 362/549 |
| 2003/0167668 A1 | 9/2003 | Kuks et al. |
| 2003/0179548 A1 | 9/2003 | Becker et al. |
| 2003/0201451 A1* | 10/2003 | Suehiro .................. H01L 33/507 257/98 |
| 2004/0213088 A1 | 10/2004 | Fuwausa |
| 2005/0084229 A1 | 4/2005 | Babbitt et al. |
| 2005/0174791 A1* | 8/2005 | Bynum .................... B60Q 3/82 362/490 |
| 2005/0189795 A1 | 9/2005 | Roessler |
| 2006/0061128 A1* | 3/2006 | Hall ........................ B60Q 3/51 296/97.9 |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0053194 A1* | 3/2007 | Tiesler .................... B60Q 3/51 362/490 |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2008/0219013 A1* | 9/2008 | Budinger ............. A61N 5/0618 362/471 |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2010/0117405 A1* | 5/2010 | Kimizuka .............. B60J 7/0015 296/214 |
| 2010/0123855 A1* | 5/2010 | Shin .................. G02F 1/133617 349/61 |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0135855 A1* | 5/2013 | Wildner ................ G09F 9/301 362/231 |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1* | 3/2015 | Grote .................... F21K 9/00 362/249.02 |
| 2015/0109602 A1 | 4/2015 | Martin et al. |
| 2015/0138789 A1 | 5/2015 | Singer et al. |
| 2015/0197186 A1 | 7/2015 | Salter et al. |
| 2015/0267881 A1 | 9/2015 | Salter et al. |
| 2015/0307033 A1 | 10/2015 | Preisler et al. |

(56) References Cited

U.S. PATENT DOCUMENTS

| | | | |
|---|---|---|---|
| 2016/0016506 A1 | 1/2016 | Collins et al. | |
| 2016/0102819 A1 | 4/2016 | Misawa et al. | |
| 2016/0131327 A1 | 5/2016 | Moon et al. | |
| 2016/0236613 A1 | 8/2016 | Trier | |
| 2016/0240794 A1 | 8/2016 | Yamada et al. | |
| 2017/0158125 A1 | 6/2017 | Schuett et al. | |
| 2017/0253179 A1* | 9/2017 | Kumada | B60Q 3/68 |

FOREIGN PATENT DOCUMENTS

| | | | | |
|---|---|---|---|---|
| CN | 201193011 Y | 2/2009 | | |
| CN | 204127823 U | 1/2015 | | |
| DE | 4120677 A1 | 1/1992 | | |
| DE | 29708699 U1 | 7/1997 | | |
| DE | 10319396 A1 | 11/2004 | | |
| EP | 1793261 A1 | 6/2007 | | |
| EP | 2778209 A1 | 9/2014 | | |
| JP | 2000159011 A | 6/2000 | | |
| JP | 2007238063 A | 9/2007 | | |
| KR | 20060026531 A | 3/2006 | | |
| WO | WO 0149525 A1 * | 7/2001 | | B60Q 3/208 |
| WO | 2006047306 A1 | 5/2006 | | |
| WO | 2014068440 A1 | 5/2014 | | |
| WO | 2014161927 A1 | 10/2014 | | |

\* cited by examiner

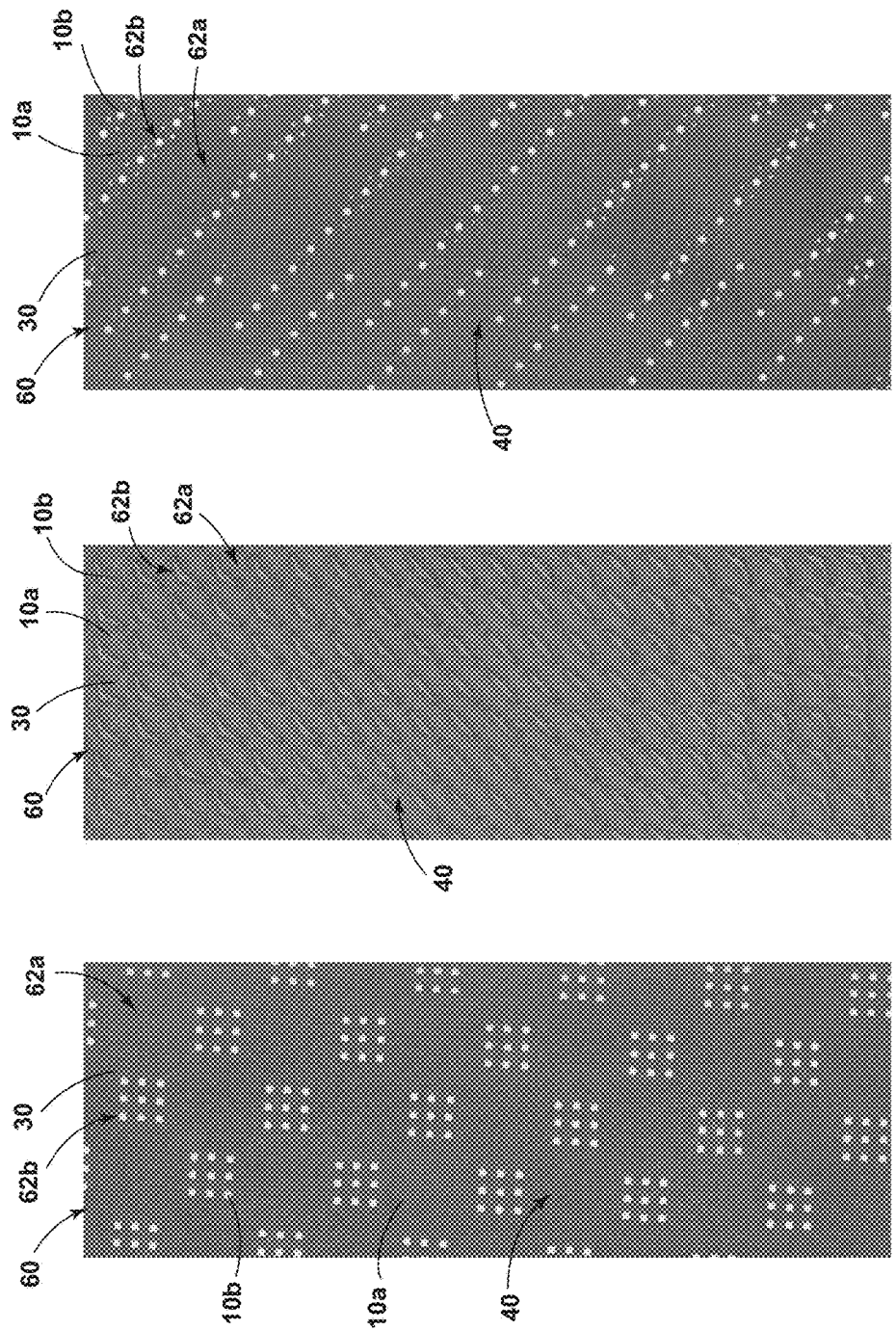

VEHICLE LIGHT SYSTEM

FIELD OF THE INVENTION

The present invention generally relates to vehicular lighting, and more particularly to vehicle lighting assemblies disposed within a cabin of the vehicle.

BACKGROUND OF THE INVENTION

Illumination arising from the use of luminescent structures offers a unique and attractive viewing experience. It is therefore desired to implement such structures in automotive vehicles for various lighting applications.

SUMMARY OF THE INVENTION

According to one aspect of the present disclosure, vehicle is disclosed. The vehicle includes a headliner including a cover. A first luminescent structure is disposed on the cover and is configured to luminesce in response to excitation by a light assembly. The light assembly is disposed below the headliner. A controller is configured to activate the light assembly. The light assembly independently illuminates various portions of the luminescent structure.

According to another aspect of the present disclosure, a headliner for a vehicle is disclosed. The headliner includes a backing panel, a foam panel, and a cover. A first material defines a first pattern on the cover and includes a first luminescent structure within the material. The first pattern is visible in a luminescent and non-luminescent state. A second material defines a second pattern on the cover and includes a second luminescent structure. A light assembly is configured to excite the first and second luminescent structures.

According to yet another aspect of the present disclosure, a vehicle light assembly is disclosed. The light assembly includes a substrate and a lens. The substrate is coupled to a pillar of a vehicle. First and second light sources are disposed between the substrate and the lens. A decorative layer is disposed on a surface of the lens. The decorative layer blocks light from exiting a first portion of the lens while allowing light through a second portion of the lens and towards a headliner.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6B is a bottom view of the portion of the headliner having the luminescent structure thereon defining a square-based pattern;

FIG. 6C is a bottom view of the portion of the headliner having the luminescent structure thereon defining a diamond-plate pattern;

FIG. 6D is a bottom view of the portion of the headliner having the luminescent structure thereon defining a diagonal dotted pattern;

DETAILED DESCRIPTION OF THE PREFERRED EMBODIMENTS

Figure 2:
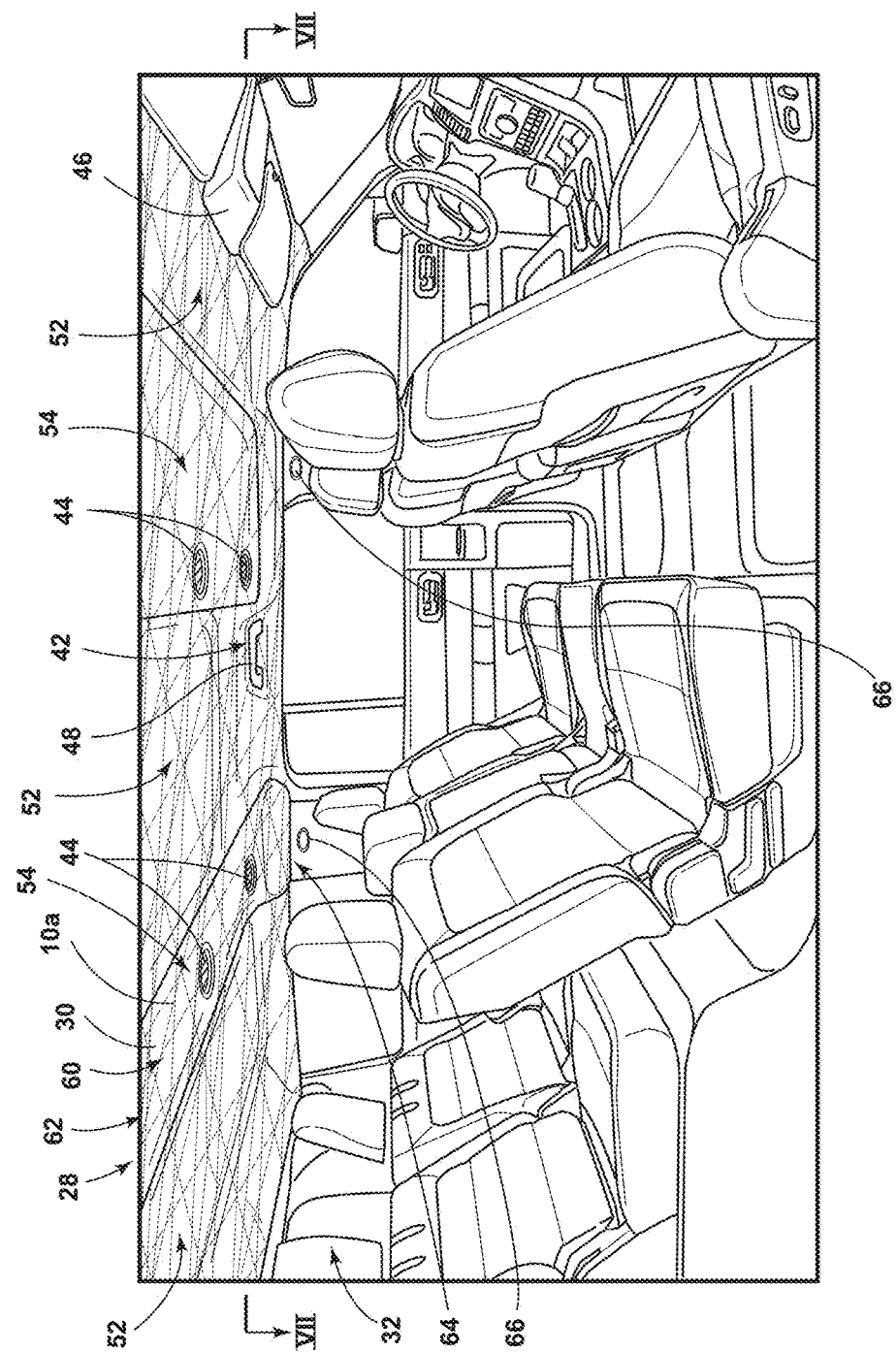
FIG. 2 is a side perspective view of a vehicle cabin having a headliner that is utilized within a light system, according to various embodiments.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light system for a vehicle. In various embodiments, the light system alters an illumination pattern based on a wide array of vehicle conditions. The light system may advantageously employ one or more phosphorescent and/or luminescent structures to illuminate in response to predefined events. The one or more luminescent structures may be configured to convert excitation light received from an associated light source and re-emit the light at a different wavelength typically found in the visible spectrum.

Figure 1A:
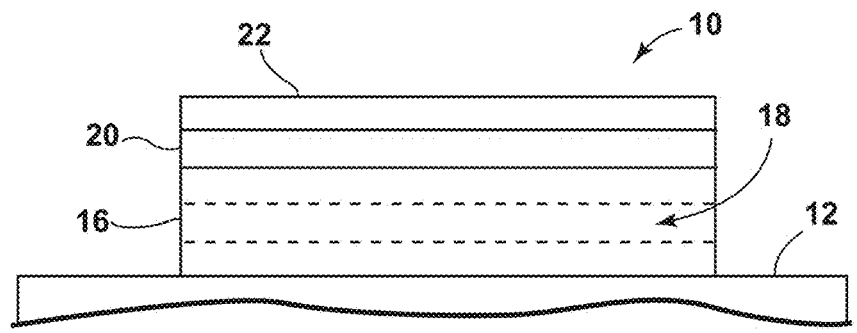
FIG. 1A is a side view of a luminescent structure rendered as a coating, according to various embodiments.
Figure 1B:
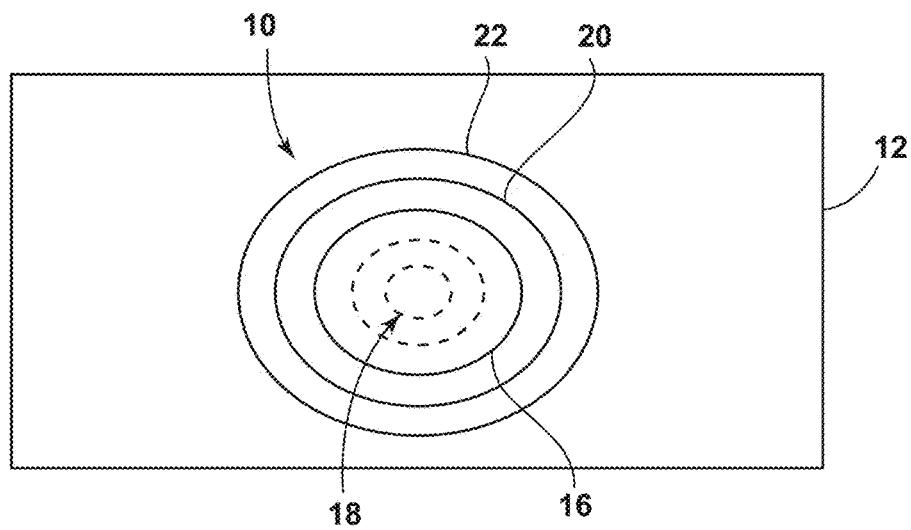
FIG. 1B is a top view of a luminescent structure rendered as a discrete particle according to various embodiments.
Figure 1C:
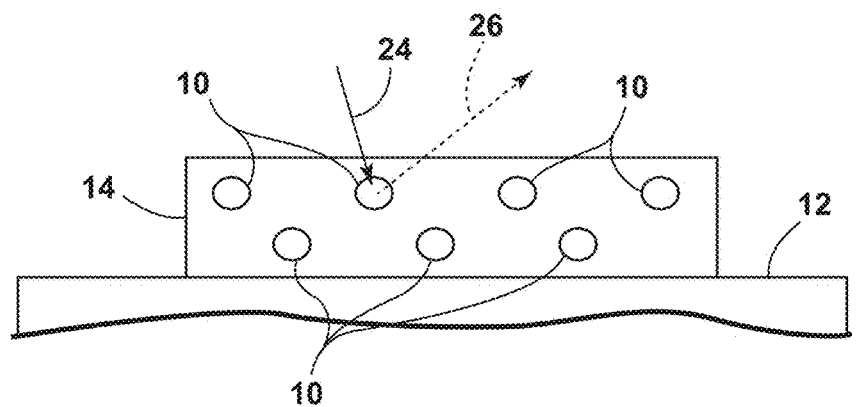
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 70 (FIG. 5) may be referred to herein as excitation light 24 and is illustrated herein as solid arrows. In contrast, light emitted from the luminescent structure 10 may be referred to herein as converted light 26 and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat.

No. 9,057,021 to Kingsley et al., and U.S. Pat. No. 8,846,184 to Agrawal et al., all of which are incorporated herein by reference in its entirety.

According to various embodiments, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 $mcd/m^2$. A visibility of 0.32 $mcd/m^2$ is roughly 100 times the sensitivity of the dark-adapted human eye, which corresponds to a base level of illumination commonly used by persons of ordinary skill in the art.

Figure 5:
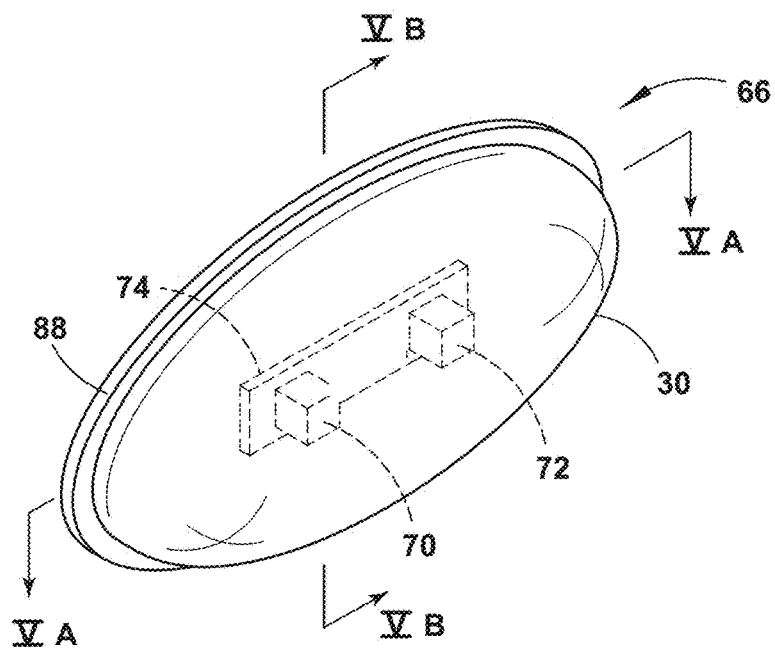
FIG. 5 is a perspective view of the light assembly having a pair of light sources therein, according to various embodiments.

According to various embodiments, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various embodiments, the rare earth aluminum garnet type Ce phosphor may serve as the luminescent material 18 with ultra-short-persistence characteristics, which can emit the converted light 26 by absorbing purple to blue excitation light 24 emitted from the light sources 70, 72 (FIG. 5). According to various embodiments, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Agrawal et al., the entire disclosure of which is incorporated herein by reference.

Additionally, or alternatively, the luminescent material 18, according to various embodiments, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources 70, 72). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various embodiments, may be operable to emit light at or above an intensity of 0.32 $mcd/m^2$ after a period of 10 minutes. Additionally, the long-persistence luminescent material 18 may be operable to emit light above or at an intensity of 0.32 $mcd/m^2$ after a period of 30 minutes and, in various embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 70, 72 that emit the excitation light 24, including, but not limited to, natural light sources (e.g., the sun) and/or any artificial light sources 70, 72. The periodic absorption of the excitation light 24 from any excitation source may provide for a substantially sustained charge of the long-persistence luminescent material 18 to provide for consistent passive illumination. In various embodiments, a light sensor may monitor the illumination intensity of the luminescent structure 10 and actuate an excitation source when the illumination intensity falls below 0.32 $mcd/m^2$, or any other predefined intensity level.

The long-persistence luminescent material 18 may correspond to alkaline earth aluminates and silicates, for example, doped di-silicates, or any other compound that is capable of emitting light for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various embodiments, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various embodiments, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the excitation light 24 and d-d transitions of Mn2+ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S.

Pat. No. 6,117,362 to Yen et al., and U.S. Pat. No. 8,952,341 to Kingsley et al., all of which are incorporated herein by reference in their entirety.

Figure 3:
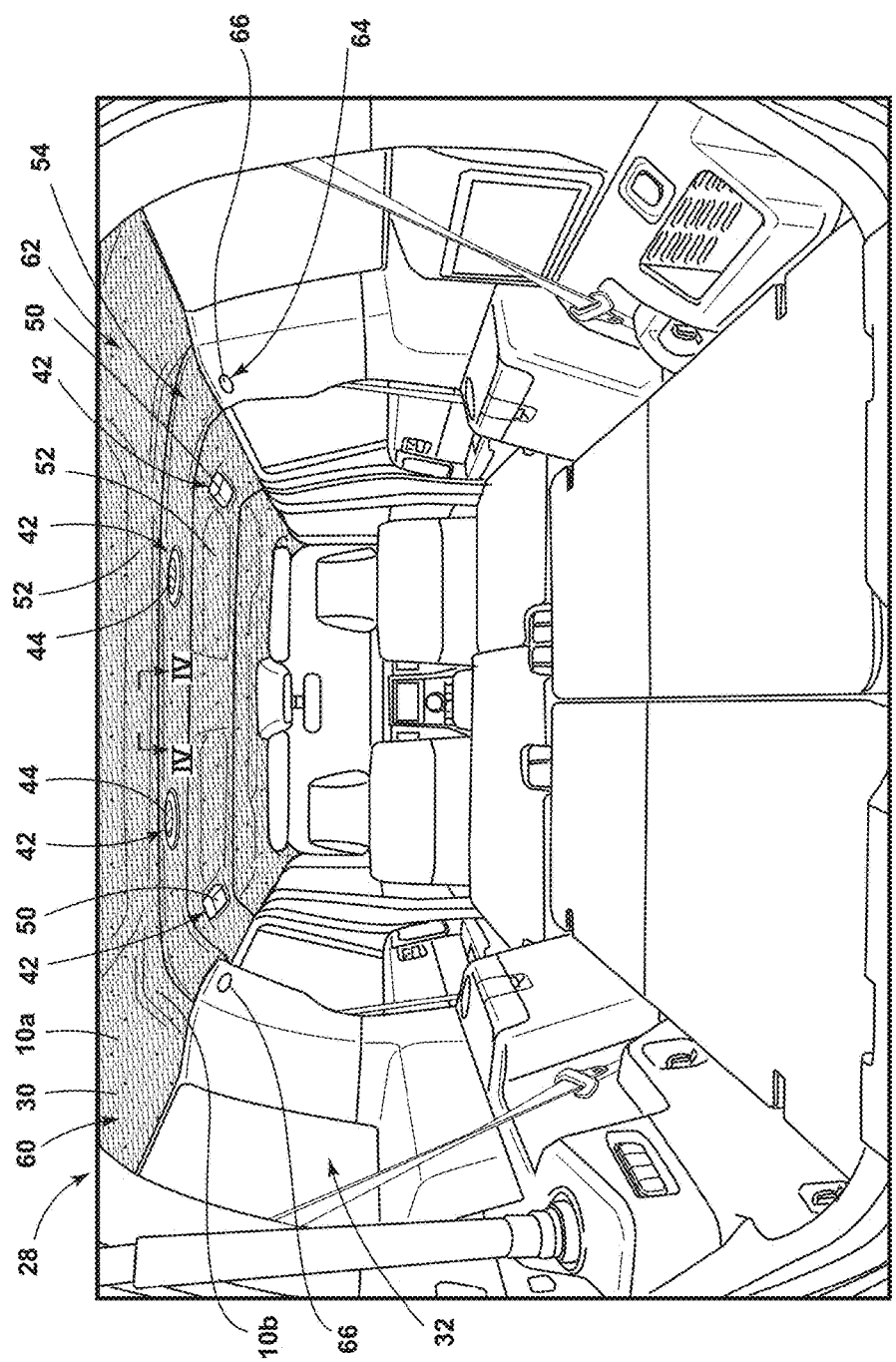
FIG. 3 is a rear perspective view of the vehicle cabin having a plurality of light assemblies disposed on a plurality of pillar trim members within the cabin, according to various embodiments.
Figure 4:
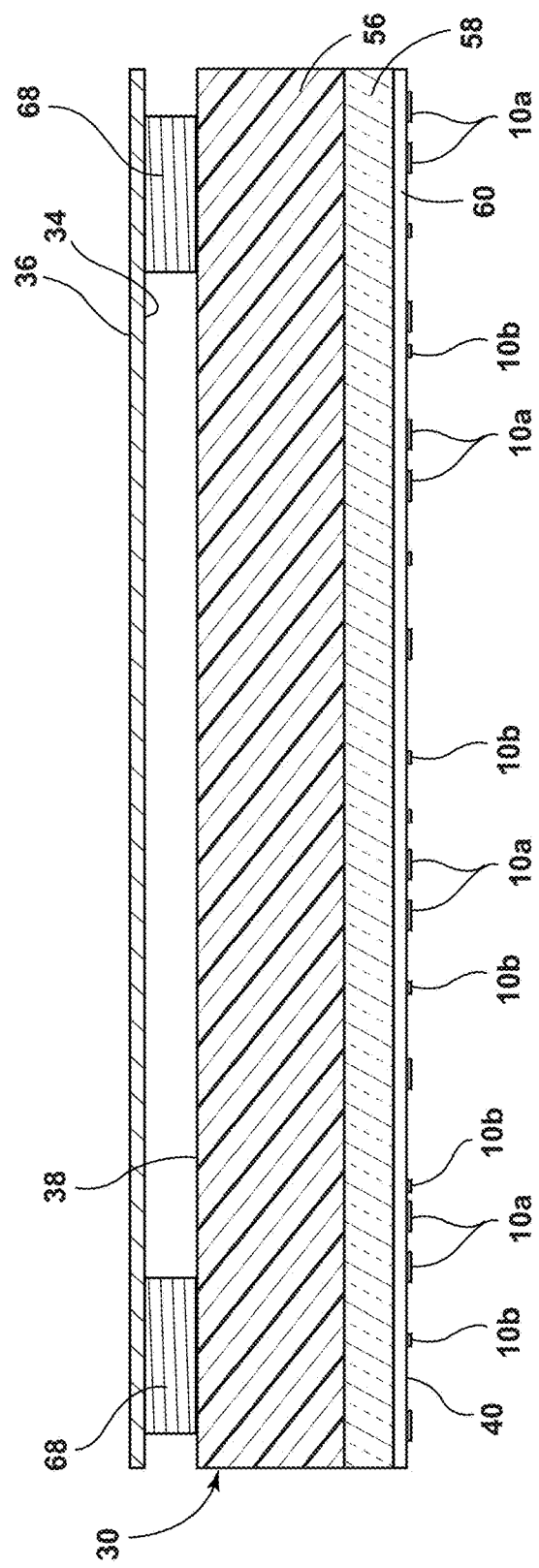
FIG. 4 is a cross-sectional view of the headliner of FIG. 3 taken along the line IV-IV illustrating the headliner having a pair of luminescent structures thereon, according to various embodiments.

Referring to FIGS. 2-4, a vehicle 28 includes an illuminated headliner 30 disposed within a vehicle cabin 32. However, other trim assemblies, including pillar trim covers, interior panels, and the like may be configured in a similar fashion to the headliner 30 provided herein. The headliner 30 may be mounted to an interior surface 34 of a roof structure 36 of the vehicle 28. The headliner 30 has a top surface 38, which faces the supporting roof structure 36 when installed in the vehicle 28, and an opposite, interior surface 40 that may provide a decorative surface visible from the interior of the vehicle 28. The headliner 30 may be shaped to conform to portions of the corresponding roof structure 36 and may include a plurality of contours and apertures for mounting various overhead components 42, such as heating, ventilation, and air conditioning (HVAC) vents 44, sun visors, overhead consoles 46, grab handles 48, dome lights 50, and the like. The headliner 30 may include one or more first sections 52 that are disposed vertically above one or more second sections 54 surrounding the first sections 52.

Referring still to FIGS. 2-4, the headliner 30 may include a backing panel 56 proximate to the roof structure 36 and a foam panel 58 attached to the backing panel 56. The backing panel 56 may support the mounting of any desired overhead components 42. The backing panel 56 can be a polymeric panel, a fiberglass panel, or any other desired material. The backing panel 56 and foam panel 58 may have any desired thickness. According to various embodiments, the foam panel 58 maintains a substantially uniform thickness along the backing panel 56. Alternatively, the foam panel 58 may have a variable thickness based on the locations of the foam panel 58 in relation to other features of the vehicle cabin 32. For instance, the foam panel 58 may be thicker, or thinner, near overhead components 42, may have a variable thickness in locations disposed above seating assemblies disposed within the vehicle 28 or may vary in thickness for any other reason without departing from the teachings provided herein. An attachment feature 68 is disposed between the backing panel 56 and the roof structure 36 to attach the two components to one another. It is contemplated that the backing panel 56 may be attached to the roof structure 36 through any means known in the art without departing from the teachings provided herein.

The bottom surface of foam panel 58 may be covered with a decorative cover 60, which can be a woven or non-woven fabric, textile, polymeric, and/or elastomeric material. A pattern 62 may be disposed on the cover 60. The pattern 62 may take any form such as a landscape graphic, a natural wood or stone image, a design, a shape or indicia. The pattern 62 may provide product information for an occupant that may be found in vehicles. Further, the pattern 62 may be provided with virtually any color or design and in any level of detail. For example, as illustrated in FIG. 2, the pattern 62 may be in the form of a "strands pattern." Additionally, or alternatively, as illustrated in FIG. 3, the pattern 62 may be in the form of a "gemstone" pattern. The pattern 62 may disposed on the cover 60 through any process known in the art. Exemplary techniques include, but are not limited to, screen printing, laser printing, lithography, wallpaper printing processes, and heat transfer processes.

With further reference to FIGS. 2-4, the headliner 30 may additionally be utilized in conjunction with a light system 64 therein. The light system 64 may include one or more luminescent structures 10a, 10b on the headliner 30 and a light assembly 66 operably coupled with the luminescent structures 10a, 10b. According to various embodiments, the pattern 62 may be defined by a first luminescent structure 10a and/or an ink defining the pattern 62 may include the first luminescent structure 10a therein. According to various embodiments, as exemplarily illustrated in FIG. 3, the cover 60 may include first and second luminescent structures 10a, 10b thereon that are excitable by varied wavelengths of excitation light 24. For example, as illustrated in FIG. 3, the first luminescent structure 10a may define the "gemstone" pattern disposed on the cover 60 and the second luminescent structure 10b may provide a starlight effect, which generally imitates the nighttime sky.

In operation, the first and/or second luminescent structures 10a, 10b may include a plurality of luminescent materials 18 therein that luminesce in response to receiving light of a specific wavelength which may be emitted by any light source within the vehicle 28. According to various embodiments, the first and/or second luminescent structures 10a, 10b discussed herein are substantially Lambertian; that is, the apparent brightness of the first and/or second luminescent structures 10a, 10b is substantially constant regardless of an observer's angle of view. As described herein, the color of the luminescence may be dependent on the particular luminescent materials 18 utilized in the first and/or second luminescent structures 10a, 10b. Additionally, a conversion capacity of the first and/or second luminescent structures 10a, 10b may be dependent on a concentration of the luminescent material 18 utilized in the first and/or second luminescent structures 10a, 10b. By adjusting the range of intensities that may excite the first and/or second luminescent structures 10a, 10b, the concentration, types, and proportions of the luminescent materials 18 in the first and/or second luminescent structures 10a, 10b discussed herein may be operable to generate a range of color hues.

According to various embodiments, the first luminescent structure 10a may include a short-persistence luminescent material 18 therein and the second luminescent may include a long-persistence luminescent material 18 therein. Accordingly, the first luminescent structure 10a may luminesce while the light assembly 66 is activated, while the second luminescent structure 10b may luminesce for a period of time while the light assembly 66 is deactivated. Furthermore, the first luminescent structure 10a may be configured to luminesce at a higher intensity than the second luminescent structure 10b.

Referring again to FIGS. 2 and 3, the vehicle 28 includes the light assembly 66 on a pillar of the vehicle 28 and is configured to emit excitation light 24 towards the first and second luminescent structures 10a, 10b. The light assembly 66 may be disposed on and/or formed with the pillar trim member and may take the form of a sconce light that emits light in an upward trajectory towards the first and second luminescent structures 10a, 10b. Moreover, the light assembly 66 may emit light downwardly to provide ambient lighting, task lighting, and/or feature lighting within the cabin 32.

Figure 5A:
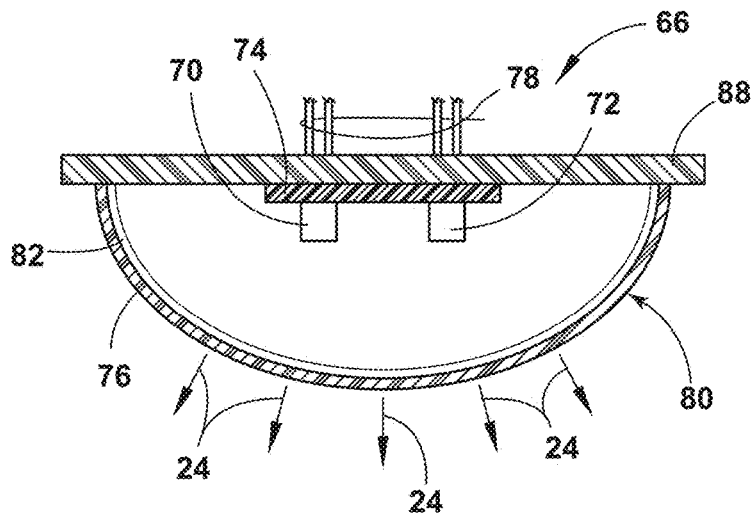
FIG. 5A is a cross-sectional view of the light assembly of FIG. 5 taken along the line VA-VA.

Referring to FIGS. 5 and 5A, the light assembly 66 may include first and second light sources 70, 72 mounted to a circuit board 74, however, in some embodiments, the illumination assembly may include just the first light source 70. The first and second light sources 70, 72 and circuit board 74 are disposed between a substrate 88 and a lens 76. The light sources 70, 72 may be configured to emit visible and/or non-visible light, such as blue light, ultraviolet (UV) light, infrared (IR) light, and/or violet light and may include any form of light source. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the light assembly 66. Further, various types of LEDs are suitable for use as the first and second light sources 70, 72 including, but not limited to, top-emitting LEDs, side-emitting LEDs, and others.

Each of light sources 70, 72 includes electrical circuitry 78 for receiving electrical power. In various embodiments, each of the light sources 70, 72 emanates excitation light 24 at a different wavelength. The lens 76 may also include optics 80 to direct the excitation light 24 generated by the first and second light sources 70, 72 into a desired illumination pattern, or light cone, to illuminate the first and/or second luminescent structures 10a, 10b. For example, the optics 80 may be configured as a Fresnel lens, a pillow optic, and/or any other type of lens or optic that is configured to disperse, concentrate, and/or otherwise direct excitation light 24 emitted from the light assembly 66 therethrough in any desired manner.

In some embodiments, the light assembly 66 may include a decorative layer 82. The decorative layer 82 may include a material that is configured to control or modify an appearance of the lens 76 and/or any other portion of the light assembly 66. For example, the decorative layer 82 may be configured to confer a metallic appearance to portions of light assembly 66, such as the lens 76. Additionally, and/or alternatively, the decorative layer 82 may be utilized to assist in concealing the light assembly 66 disposed on the pillar trim member. The decorative layer 82 can be disposed on the lens 76, and/or any other portion of the light assembly 66, through any method known in the art, including, but not limited to, sputter deposition, vacuum deposition (vacuum evaporation coating), electroplating, or directly printing onto a component of the light assembly 66. The decorative layer 82 may be chosen from a wide range of reflective materials and/or colors, including, but not limited to, silver, chrome, copper, bronze, gold, or any other metallic surface. Additionally, an imitator of any metallic material may also be utilized without departing from the teachings provided herein. In various embodiments, the decorative layer 82 may be tinted any color to complement the vehicle structure on which the light assembly 66 is to be received.

In various embodiments, the decorative layer 82 may have a textured or grained surface. The grained surface may be produced by laser etching the light assembly 66 and may provide for the light assembly 66 to have a varied or common appearance with proximately disposed components of the vehicle 28.

According to various embodiments, the light assembly 66 may provide additional light functions, in addition to exciting the first and second luminescent structures 10a, 10b. For example, the light assembly 66 may provide feature, ambient, and/or task light functions within the vehicle 28. According to various embodiments, the light assembly 66 may be utilized during a welcome/farewell sequence, meaning the light sources 70, 72 may be activated as the driver and/or an occupant of the vehicle 28 approaches and/or exits the vehicle 28. While the light assembly 66 provides one or more of the functions provided herein, the excitation light 24 emitted from the light assembly 66 may simultaneously charge the first and/or second luminescent structures 10a, 10b.

In operation, a controller 106 (FIG. 9) may control the intensity of the first and second light sources 70, 72 to ultimately affect the brightness in which the first and second luminescent structures 10a, 10b luminesce. For example, increasing the intensity of the first and second light sources 70, 72 generally results in the luminescent structures 10a, 10b exhibiting a brighter luminescence. The controller 106 may control the intensity of the first and second light sources 70, 72 through pulse-width modulation or direct current control. Additionally or alternatively, the controller 106 may control the light emission duration of the first and second light sources 70, 72 to affect the duration in which the first and second luminescent structures 10a, 10b luminesces. For example, the controller 106 may activate the first and second light sources 70, 72 for an extended duration such that the first and second luminescent structures 10a, 10b exhibit sustained luminescence. Alternatively, the controller 106 may flash the first and second light sources 70, 72 at varying time intervals such that the first and second luminescent structures 10a, 10b exhibit a blinking effect.

Figure 5B:
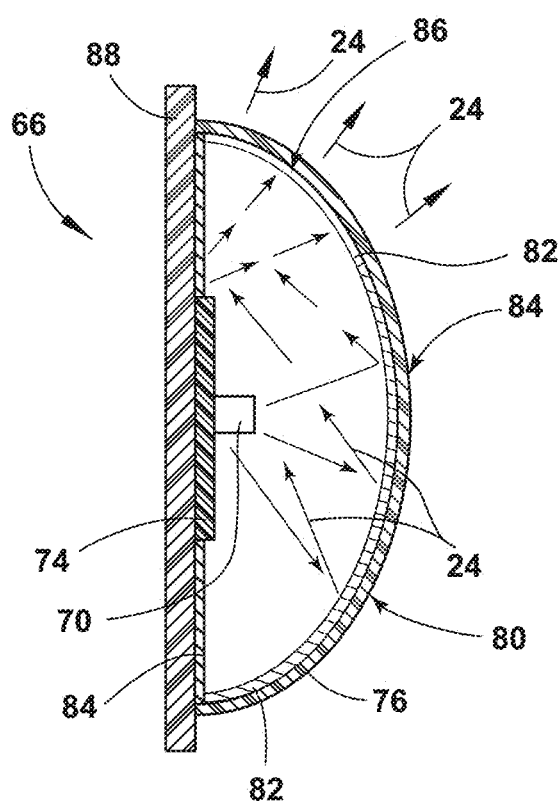
FIG. 5B is a cross-sectional view of the light assembly of FIG. 5 taken along the line VB-VB.

Referring to FIG. 5B, the decorative layer 82 may have an opaque, translucent, or light non-transmissive first portion 84 on the lens 76 and/or the substrate 88. In some embodiments, the first portion 84 may also be reflective. A second portion 86 of the decorative layer 82 may by transparent, translucent, and/or otherwise light transmissive. Accordingly, the excitation light 24 emitted from the first and second light sources 70, 72 may escape the light assembly 66 through the second portion 86. Thus, the excitation light 24 may be directed outward from the light assembly 66 in a desired pattern. Moreover, the reflective characteristics of the decorative layer 82, according to some embodiments, may increase the amount of light emitted through the second portion 86. In some embodiments, the decorative layer 82 may include just the first portion 84.

Figure 6A:
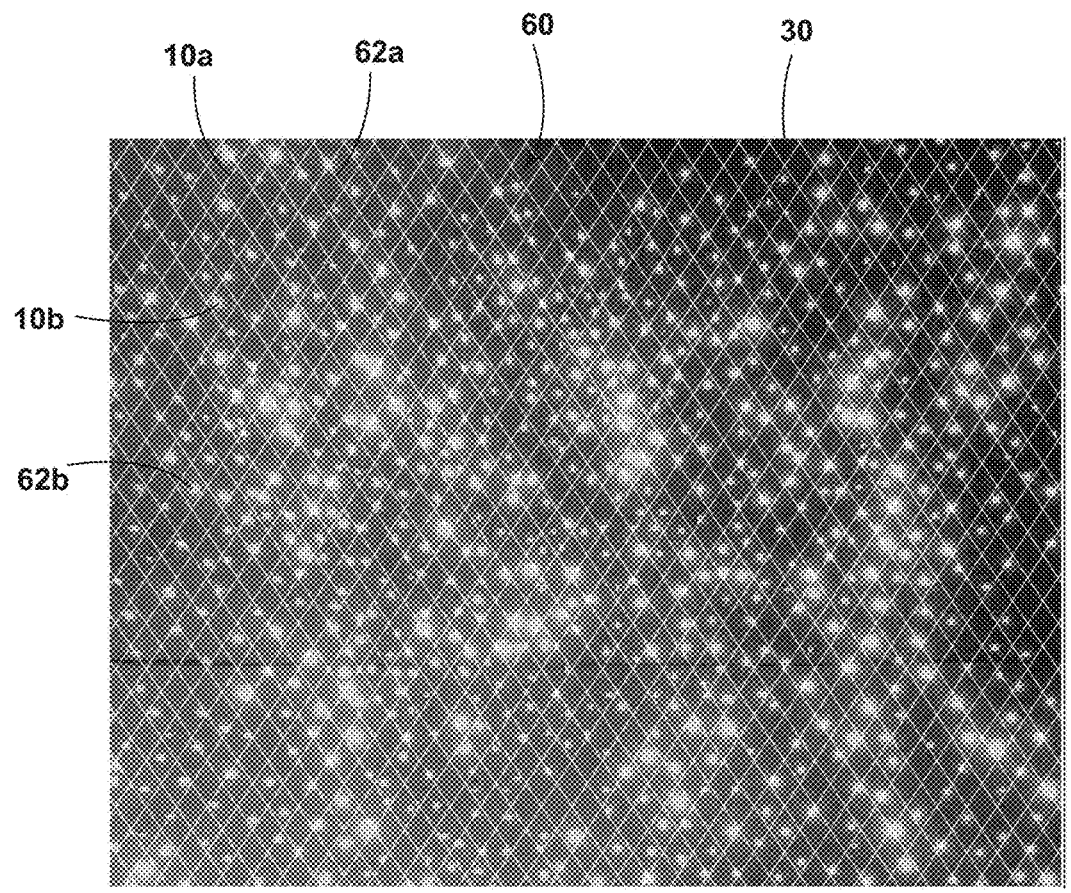
FIG. 6A is a bottom view of a portion of the headliner having a luminescent structure thereon that defines a starlight pattern.

Referring to FIGS. 6A-6D, as discussed above, a first material may define a first pattern 62a on the cover 60 that includes the first luminescent structure 10a within the material. The first pattern 62a may be visible in a luminescent and non-luminescent state. A second material defines a second pattern 62b on the cover 60 including the second luminescent structure 10b. Each luminescent structure 10a, 10b may be independently excitable by the light assembly 66. As illustrated in FIG. 6A, the first pattern 62a may be a cross-hatched pattern while the second pattern 62b is the starlight pattern. Alternatively, as illustrated in FIG. 6B, the first or second pattern 62a, 62b may be configured as a pattern having squares therein. The background may incorporate the first luminescent structure 10a while the square designs may incorporate the second luminescent structure 10b. Alternative still, as illustrated in FIG. 6C, the first luminescent structure 10a may define a background region while the second luminescent structure 10b may define a diamond plate design. Alternatively still, as illustrated in FIG. 6D, the first luminescent structure 10a may define a background region while diagonally orientated circles may include the second luminescent structure 10b. It will be appreciated, however, that the first and second luminescent structures 10a, 10b may define any desired pattern 62. Additional exemplary patterns 62 include patterns representing fabric, stone, marble, granite, or wood as well as abstract color patterns and fictional or actual photographs may be printed on the cover 60.

Figure 7:
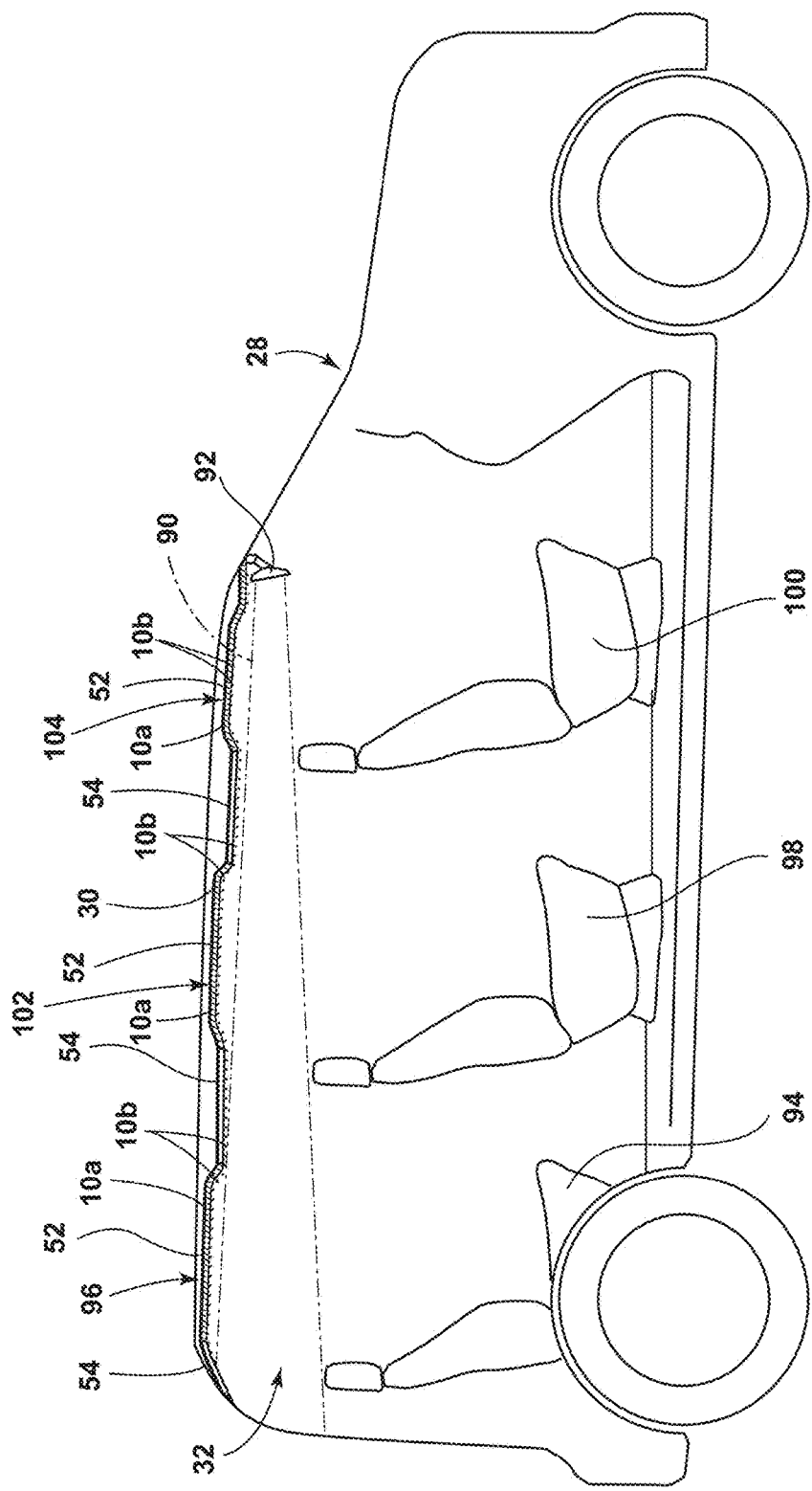
FIG. 7 is a cross-sectional view of the vehicle taken along the line VII-VII of FIG. 2, according to various embodiments.

Referring to FIG. 7, a schematic diagram of the vehicle 28 having the first and second luminescent structures 10a, 10b on the headliner 30 is shown. According to various embodiments, the first and second light sources 70, 72 are operably coupled with the optics 80 such that portions of the first and second luminescent structures 10a, 10b located in the first, upper sections may exhibit a greater degree of luminescence than the first and second luminescent structures 10a, 10b in the second, lower sections. With respect to the illustrated embodiment, the first and second light sources 70, 72 may emit a first, higher intensity of excitation light 24 at the headliner 30 when the vehicle 28 is stationary and a second, lower intensity of excitation light 24 at the first sections 52 when the vehicle 28 is in motion.

As is also shown in FIG. 7, the first sections 52 are generally more obscured from a field of view 90 of a rear mirror assembly 92 whereas some or all of the second sections 54 may become visible in the field of view 90 (e.g., by repositioning the rear mirror assembly 92). According to various embodiments, the first and second luminescent structures 10a, 10b in the obscured portions luminesce when the vehicle 28 is in drive to prevent the driver from being blinded in dark conditions. For example, the controller 106 may activate only the first and second light sources 70, 72 responsible for exciting the corresponding section of the first and second luminescent structures 10a, 10b. Each of the first and second sections 52, 54 may also be independently illuminated. The activation of the first and second light sources 70, 72 may be based on a signal received from vehicle equipment 114 (FIG. 9), a user-operated switch, and/or a vehicle-related condition.

According to various embodiments, the first and/or second sections 52, 54 of the headliner 30 may luminesce alone or in combination depending on the needs of the vehicle occupants. For instance, a vehicle occupant sitting in occupant seating area 94 may control the illumination of section 96 via a user-operated switch located in the vehicle cabin 32. Likewise, vehicle occupants sitting in occupant seating areas 98 and 100 may control the illumination of sections 102 and 104, respectively. It is further contemplated that a master switch may be operated to allow or prevent vehicle occupants from controlling the illumination of sections 96, 102, and 104 while the vehicle 28 is in drive.

Figure 8:
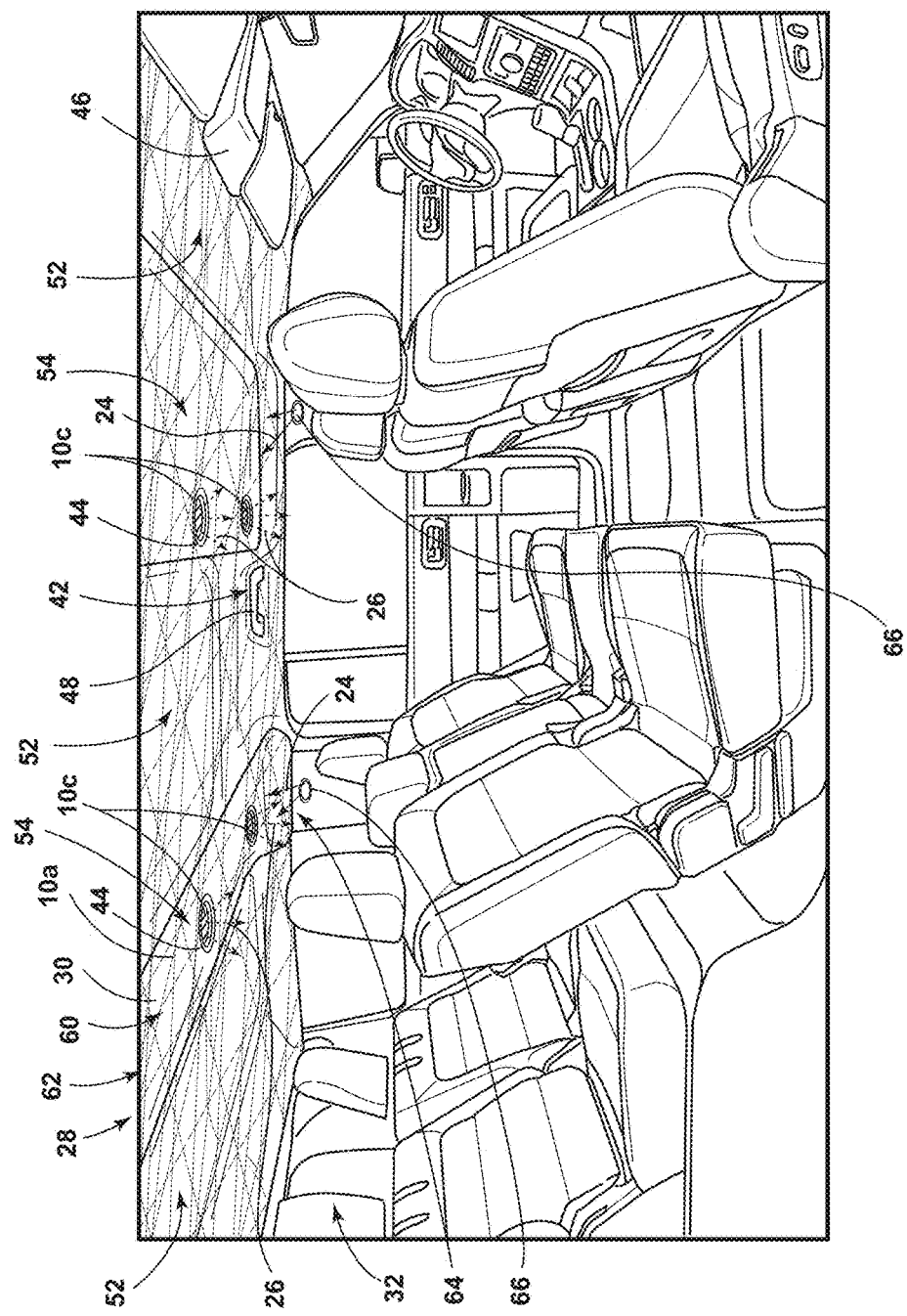
FIG. 8 is a side perspective view of a vehicle cabin having a headliner that is utilized within a light system, according to various embodiments.

Referring to FIG. 8, the headliner 30 may be operably coupled with a roof duct, which engages with an air supply to receive directed air from the HVAC system that may be located in an engine compartment of the vehicle 28. The HVAC system selectively cools and heats air and directs the air through the vents 44 to enter the cabin 32 of the vehicle 28. The vents 44 may be disposed within the headliner 30 and may include a third luminescent structure 10c thereon. According to various embodiments, the third luminescent structure 10c may luminesce in an array of colors. For example, the vents 44 may luminesce in a first color (e.g., red) when heated air is exiting through the vents 44. The vents 44 may luminesce in a second color (e.g., blue) when cooled air is supplied through the vents 44. The light assembly 66 may provide excitation light 24 for the vents 44 causing the vents 44 to luminesce.

Figure 9:
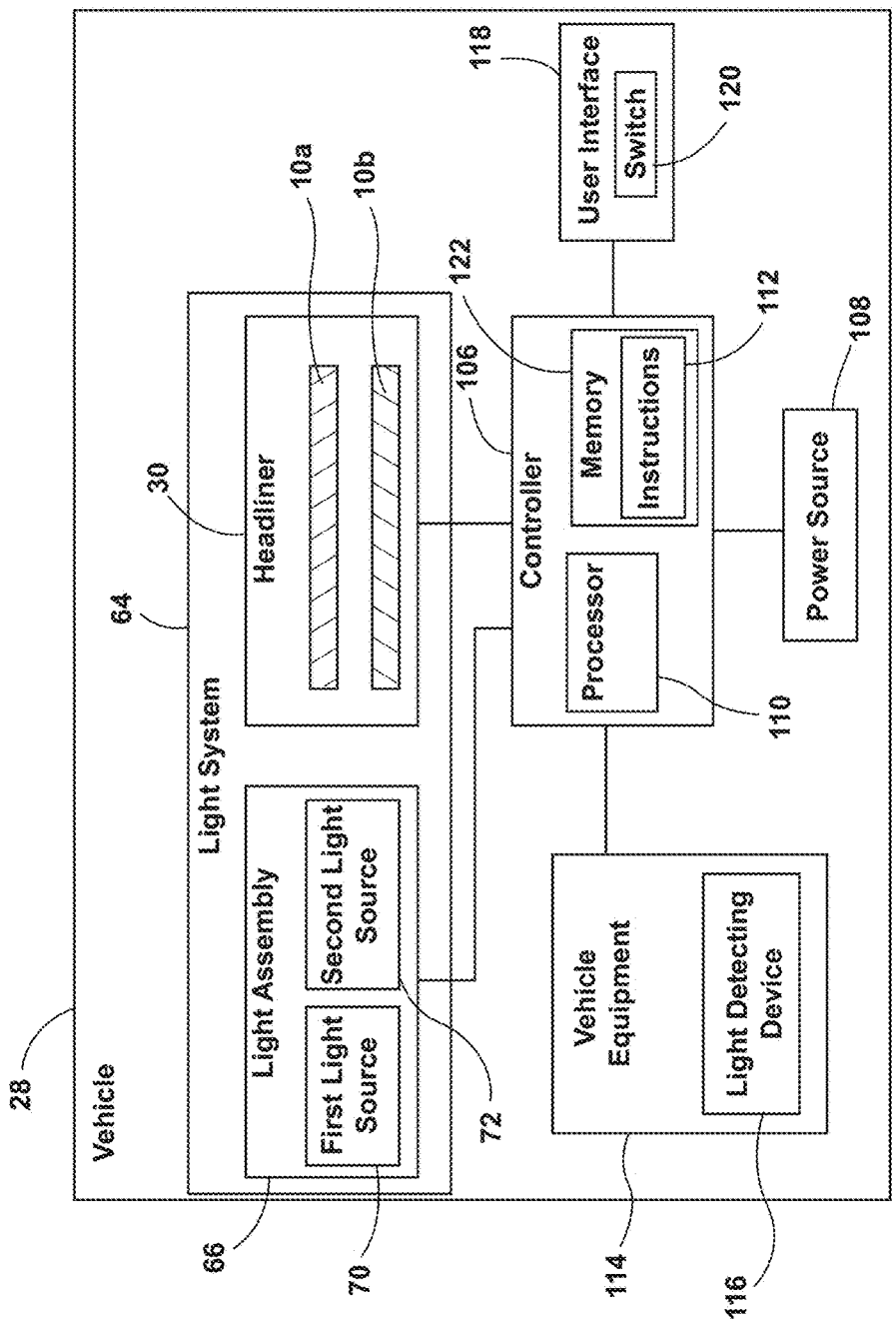
FIG. 9 is a block diagram of the vehicle employing the light system, according to various embodiments.

Referring to FIG. 9, a block diagram of the vehicle 28 incorporating the headliner 30 is shown, according to various embodiments. The vehicle 28 includes the light assembly 66, which is electrically coupled to a controller 106. The controller 106 is electrically connected to a power source 108. In various embodiments, the power source 108 may correspond to a vehicular power source operating at 12 to 16 VDC. The controller 106 may be variously located within the vehicle 28 and includes a processor 110 in communication with a memory 122. The memory 122 includes instructions 112 stored thereon that are executable by the processor 110.

The controller 106 may be communicatively coupled to one or more vehicle equipment 114 and use signals received therefrom to control the light assembly 66, which determines the resultant luminescent appearance exhibited by the headliner 30. The controller 106 may communicate with the one or more vehicle equipment 114 and may receive signals therefrom directed to a vehicle-related condition such as, but not limited to, an operational state of the vehicle 28, a status related to a particular vehicle equipment 114 (e.g., door open status), a key fob proximity status, a remote signal sourced from a portable electronic device, a status related to an operating environment of the vehicle 28 (e.g., an ambient light level), an occupant illumination preference, or any other information or control signal that may be utilized to activate or otherwise adjust the output of the light assembly 66.

The vehicle equipment 114 may also include a light-detecting device 116 that may be utilized for varying the intensity of excitation light 24 emitted from the light assembly 66. The light-detecting device 116 senses the environmental lighting conditions, such as whether the vehicle 28 is in day-like conditions (i.e., higher light level conditions) and/or whether the vehicle 28 is in night-like conditions (i.e., lower light level conditions). The light-detecting device 116 can be of any suitable type and can detect the day-like and night-like conditions in any suitable fashion. For instance, in one embodiment, the light-detecting device 116 includes a light sensor that detects the amount of light (e.g., solar radiation) affecting the vehicle 28 for determining whether day-like or night-like conditions exist. According to one embodiment, a lower initial intensity of excitation light 24 may be emitted by the light assembly 66 when the light-detecting device 116 senses night-like conditions. A higher initial intensity of excitation light 24 may be emitted when the light-detecting device 116 senses day-like conditions.

Further, the controller 106 may be communicatively coupled to a user interface 118 that may be configured to allow a user to control the light sources 70, 72. According to various embodiments, the user interface 118 includes the switch 120, thereby allowing a user to control the corresponding light sources 70, 72 based on at least one touch event. The switch 120 may be located on, or within, the light assembly 66, or elsewhere located in the vehicle 28. With respect to the above examples, the controller 106 may modify the intensity of the emitted first and second wavelengths of light by pulse-width modulation or current control. In some embodiments, the controller 106 may be configured to adjust a color of the converted light 26 by sending control signals to adjust an intensity or energy output level of the light assembly 66. For example, if the light assembly 66 is configured to output the excitation light 24 at a low level, substantially all of the excitation light 24 may be converted to the outputted, visible light. If the light sources 70, 72 are configured to emit excitation light 24 at a high level, only a portion of the excitation light 24 may be converted to the converted light 26 by the luminescent structures 10a, 10b. In this configuration, a color of light corresponding to a mixture of the excitation light 24 and the converted light 26 may be output as the converted light 26. In this way, each of the controllers 106 may control an output color of the outputted converted light 26.

Though a low level and a high level of intensity are discussed in reference to the excitation light 24, it shall be understood that the intensity of the excitation light 24 may be varied among a variety of intensity levels to adjust a hue of the color corresponding to the emitted excitation light 24 and/or converted light 26.

A variety of advantages may be derived from the use of the present disclosure. For example, use of the light system disclosed herein provides a wide array of vehicle light functions, such as dome lighting, task lighting, ambient lighting feature lighting, and/or backlighting. Moreover, the light system disclosed herein may provide new and unique design characteristics to the vehicle that raise the perceived value of the vehicle. The light system may be manufactured at low costs when compared to standard vehicle light assemblies.

According to various embodiments, a vehicle is provided herein. The vehicle includes a headliner including a cover. A first luminescent structure is disposed on the cover and is configured to luminesce in response to excitation by a light assembly. The light assembly is disposed below the headliner. A controller is configured to activate the light assembly. The light assembly independently illuminates various portions of the luminescent structure. Embodiments of the vehicle can include any one or a combination of the following features:

- the first luminescent structure defines a pattern on the cover, wherein the pattern is visible when the luminescent structure is in both luminescent and non-luminescent states;
- a second luminescent structure disposed on the cover that is configured to luminesce in response to excitation by a light assembly;
- first and second light sources disposed within the light assembly, the first and second light sources configured to independently excite the first and second luminescent structures;
- the headliner includes a first section and a second section, the first section vertically disposed above the second section;
- the light assembly is configured to excite the first luminescent structure within the first section when the vehicle is in motion;
- a light-detecting device, wherein an intensity of excitation light emitted from the light assembly is decreased when the light-detecting device senses night-like conditions;
- the headliner is formed from a non-woven textile and the pattern imitates a woven pattern;
- the first luminescent structure includes a short-persistence luminescent material and the second luminescent structure includes a long-persistence luminescent material;
- the second luminescent structure is configured in a starlight pattern;
- the light assembly includes a substrate and a lens;
- the headliner includes a first material defining a first pattern on the cover including the first luminescent structure within the material, the first pattern visible in a luminescent and non-luminescent state and a second material defining a second pattern on the cover including a second luminescent structure;
- the first luminescent structure includes a short-persistence luminescent material and the second luminescent structure includes a long-persistence luminescent material; and/or
- the light assembly is disposed on a pillar within the vehicle.

Moreover, a lighting method is provided herein. The method includes attaching a headliner including a cover to a vehicle; disposing a first luminescent structure on the cover; attaching a light assembly to a pillar within the vehicle; and activating the light assembly disposed below the headliner causing the first luminescent structure to luminesce.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle, comprising:
a first luminescent structure disposed on a cover of a headliner and configured to luminesce in response to excitation by a light assembly including an optic lens having at least one light-blocking portion, wherein the light assembly is disposed below the headliner and configured to direct light towards the cover while blocking a direct line of sight of the light to a seating assembly; and
a controller configured to activate the light assembly to independently illuminate various portions of the luminescent structure.

2. The vehicle of claim 1, wherein the first luminescent structure defines a pattern on the cover, wherein the pattern is visible when the luminescent structure is in both luminescent and non-luminescent states.

3. The vehicle of claim 1, further comprising:
a second luminescent structure disposed on the cover that is configured to luminesce in response to excitation by a light assembly.

4. The vehicle of claim 3, further comprising:
first and second light sources disposed within the light assembly, the first and second light sources configured to independently excite the first and second luminescent structures.

5. The vehicle of claim 1, wherein the headliner includes a first section and a second section, the first section vertically disposed above the second section.

6. The vehicle of claim 5, wherein the light assembly is configured to excite the first luminescent structure within the first section when the vehicle is in motion.

7. The vehicle of claim 1, wherein the light assembly is disposed on a pillar within the vehicle.

8. The vehicle of claim 1, further comprising:
a light-detecting device, wherein an intensity of excitation light emitted from the light assembly is decreased when the light-detecting device senses night-like conditions.

9. The vehicle of claim 1, wherein the headliner is formed from a non-woven textile and the pattern imitates a woven pattern.

10. The vehicle of claim 3, wherein the first luminescent structure includes a short-persistence luminescent material and the second luminescent structure includes a long-persistence luminescent material.

11. The vehicle of claim 10, wherein the second luminescent structure is configured in a starlight pattern.

12. A headliner for a vehicle, comprising:
a first luminescent structure defining a first pattern on a cover and visible in a luminescent and non-luminescent state;
a second luminescent structure defining a second pattern on the cover disposed vertically above the first luminescent structure;
a light assembly configured to excite the first and second luminescent structures; and
a decorative layer surrounding the light assembly and having a transparent portion disposed vertically above an opaque portion.

13. The headliner for a vehicle of claim 12, wherein the light assembly includes a substrate and a lens, the substrate coupled to a pillar of a vehicle.

14. The headliner for a vehicle of claim 13, further comprising:
an opaque material disposed on a bottom portion of the lens; and
a reflective material disposed on an inner surface of the lens, wherein the light assembly directs excitation light towards said headliner of a vehicle.

15. The headliner for a vehicle of claim 12, wherein the first luminescent structure includes a short-persistence luminescent material and the second luminescent structure includes a long-persistence luminescent material.

16. A vehicle light assembly, comprising:
a substrate and a lens, the substrate coupled to a pillar of a vehicle;
first and second light sources disposed between the substrate and the lens; and
a decorative layer disposed on a surface of the lens, wherein the decorative layer blocks light from exiting a first portion of the lens while allowing light through a second portion of the lens and towards a headliner having a first material defining a first pattern on a cover including a first luminescent structure within the material, the first pattern visible in a luminescent and non-luminescent state and a second material defining a second pattern on the cover including a second luminescent structure.

17. The light assembly for a vehicle of claim 16, wherein the first and second light sources are operably coupled with a luminescent structure disposed on the headliner of a vehicle.

18. The light assembly for a vehicle of claim 16, wherein the first and second light sources independently illuminate various portions of the headliner.

19. The light assembly for a vehicle of claim 16, wherein the first luminescent structure includes a short-persistence luminescent material and the second luminescent structure includes a long-persistence luminescent material.

* * * * *